W. & D. WATSON.
Friction Clutches.

No. 152,027. Patented June 16, 1874.

Witnesses
S. N. Piper
L. W. Hosler

William Watson
Donald Watson
by their attorney
R. H. Eddy

UNITED STATES PATENT OFFICE.

WILLIAM WATSON AND DONALD WATSON, OF SOMERVILLE, MASS.

IMPROVEMENT IN FRICTION-CLUTCHES.

Specification forming part of Letters Patent No. 152,027, dated June 16, 1874; application filed May 27, 1874.

*To all whom it may concern:*

Be it known that we, WILLIAM WATSON and DONALD WATSON, of Somerville, of the county of Middlesex and State of Massachusetts, have invented a new and useful Improvement in Friction Mechanism for Loose Pulleys or Gears; and do hereby declare the same to be fully described in the following specification and represented in the accompanying drawings, of which—

Figure 1:
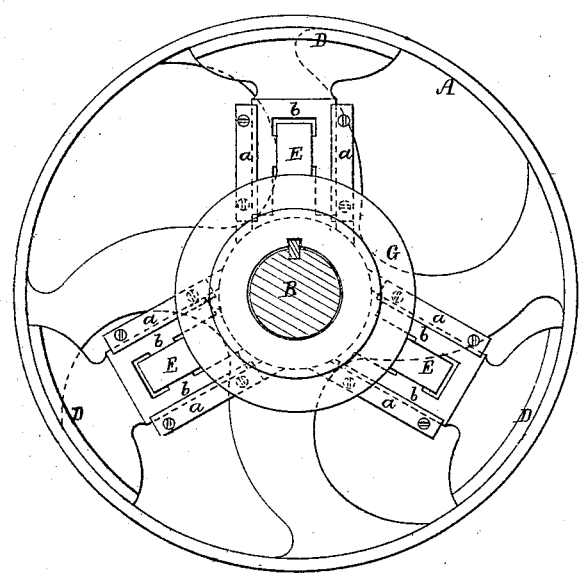
Figure 2:
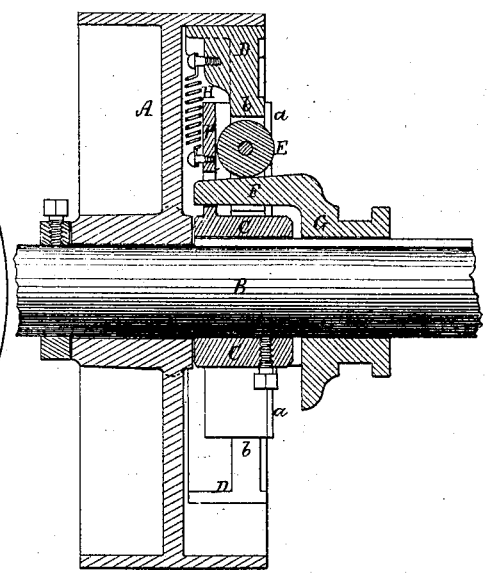

Figure 1 is a side elevation, and Fig. 2 a vertical and transverse section, of a loose pulley and its shaft provided with my invention.

In such drawings, A denotes the pulley or wheel, which is to revolve freely on the shaft B. There is fixed to the shaft and within the wheel a hub, C, provided with a series of pairs of guides or arms, $a\ a$, those of each pair being parallel, and the whole being arranged as shown. The shank $b$ of a series of friction-brakes, D D D, is inserted between the guides $a\ a$ of each pair, and by them is guided in a line radial to the axis of the shaft. Each shank $b$ is slotted or forked to receive and carry a roller, E, that is pivoted to the shank, and rests on one of a series of inclined planes or wedges, F F F, projected from the face of a grooved hub, G. This hub is fitted to slide longitudinally on the shaft, and caused to revolve with it by a spline or feather connection. By pressing or moving the hub and the inclined planes forward, the several brakes will be forced outward against the inner periphery of the rim of the loose pulley, so as to cause said pulley, by friction against the brakes, to revolve the shaft. A reverse movement of the hub and its inclined planes will set the brakes free, in order that each may be retracted or drawn away from the rim of the pulley by a spring, H, fixed to the brake and to the connection-piece $p$ of the arms or guides of the shank of the brake.

We do not claim, in connection with a pulley and shaft, a series of brakes and mechanism for operating them, in order to clutch by friction the pulley to the shaft, so that the latter may revolve the former, or vice versa; but our system of inclined planes and rollers is not only easy and effective in operation, but better, for various reasons, than toggles as generally employed for setting the brakes up to the rim of the loose pulley.

We claim—

For moving the several friction-brakes D simultaneously toward the rim of the wheel or loose pulley A, the series of rollers E and inclined planes F, arranged together and combined with the brakes D and shaft B by means substantially as explained, the brakes being furnished with retractive springs, as set forth.

WILLIAM WATSON.
DONALD WATSON.

Witnesses:
R. H. EDDY,
J. R. SNOW.